(12) United States Patent
Shinohara

(10) Patent No.: US 7,778,515 B2
(45) Date of Patent: Aug. 17, 2010

(54) SYSTEM AND METHOD FOR LINKING DVD TEXT TO RECOMMENDED VIEWING

(75) Inventor: Hiroaki Shinohara, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 3299 days.

(21) Appl. No.: 09/898,422

(22) Filed: Jul. 2, 2001

(65) Prior Publication Data

US 2003/0002850 A1 Jan. 2, 2003

(51) Int. Cl.
*H04N 5/76* (2006.01)

(52) U.S. Cl. .................. 386/46; 386/125; 386/126

(58) Field of Classification Search ............ 386/46, 386/83, 1, 45, 125–126; 725/53, 57, 61; 345/327
See application file for complete search history.

(56) References Cited

U.S. PATENT DOCUMENTS

| 5,541,738 | A | * | 7/1996 | Mankovitz | 386/83 |
|---|---|---|---|---|---|
| 5,659,613 | A | * | 8/1997 | Copeland et al. | 380/202 |
| 6,163,316 | A | * | 12/2000 | Killian | 715/721 |
| 6,177,931 | B1 | * | 1/2001 | Alexander et al. | 725/52 |
| 6,360,216 | B1 | * | 3/2002 | Hennessey et al. | 1/1 |
| 6,580,870 | B1 | * | 6/2003 | Kanazawa et al. | 386/95 |
| 6,628,287 | B1 | * | 9/2003 | Duda et al. | 345/475 |
| 6,668,377 | B1 | * | 12/2003 | Dunn | 725/92 |
| 6,711,586 | B1 | * | 3/2004 | Wells | 1/1 |
| 6,865,746 | B1 | * | 3/2005 | Herrington et al. | 725/53 |
| 2001/0009427 | A1 | * | 7/2001 | Kaneko et al. | 345/854 |
| 2001/0019367 | A1 | * | 9/2001 | Walton et al. | 348/734 |
| 2002/0040329 | A1 | * | 4/2002 | Cohen et al. | 705/27 |
| 2003/0208757 | A1 | * | 11/2003 | Hoath | 725/39 |
| 2004/0005923 | A1 | * | 1/2004 | Allard et al. | 463/35 |
| 2006/0181965 | A1 | * | 8/2006 | Collart | 369/30.01 |

* cited by examiner

*Primary Examiner*—Thai Tran
(74) *Attorney, Agent, or Firm*—John L. Rogitz

(57) ABSTRACT

A system and method for automatically linking DVD text to recommended viewing, based on a viewer selection of a word or phrase displayed in a DVD-based program. A microprocessor in a PVR associated with the TV can automatically record TV programming or recommend additional products and/or programs based on the selected word or phrase from the DVD text.

7 Claims, 1 Drawing Sheet

SYSTEM AND METHOD FOR LINKING DVD TEXT TO RECOMMENDED VIEWING

BACKGROUND OF THE INVENTION

1. Field of the Invention

The present invention relates generally to television systems.

2. Description of the Related Art

Televisions and computers have become ubiquitous, and since both usually entail a visual display, efforts have been made to integrate both functions into a single system. In this way, a consumer need not purchase and operate two separate systems, which can burden some consumers who, while familiar with operating a television and its remote control, might not be familiar with operating, e.g., an Internet computer.

To the extent that attempts have been made to combine television with Internet features, it has generally been with the focus of producing what might be thought of as a "lean forward" system. That is, hybrid TV/computers have typically been more oriented toward productivity, generally thought of as a computer system characteristic, and less toward entertainment ("lean back"), generally regarded as a television system characteristic. It is not just the dichotomy between productivity and entertainment that distinguishes a "lean forward" experience from a "lean back" experience, however. As contemplated herein, "lean back" activities can extend to purchasing products that are advertised on TV, as opposed to, e.g., making products for sale. In any case, with the above-mentioned critical observation of the present invention in mind, it can readily be appreciated that the differences between a system designed for "lean forward" experiences and a system designed for "lean back" experiences can be both subtle and profound.

In the above context, the present invention recognizes that in one aspect of a lean-back experience, a viewer might be interested in obtaining further programming that is related to something the viewer found interesting in, for instance, a DVD program that the viewer displays on the TV. For example, a viewer might be interested in viewing additional programs that star an actor featured on a DVD movie. Conventionally, the viewer would have to manually browse for such programming, or for related products, which can be cumbersome and time-consuming and which might be done after the viewer's interest has waned. The present invention critically observes that it would be advantageous to provide a TV viewer with a means to obtain recommended programming/products based on a viewer selection of DVD content in a manner that is more convenient than is currently afforded.

SUMMARY OF THE INVENTION

A system for returning recommendations related to a recorded program includes a TV and a processor such as might be incorporated in a personal video recorder (PVR) that is coupled to the TV. The processor receives media-stored content and accesses a database to return recommendations or to record a broadcast program preferably based on viewer selections of the content, e.g., the viewer can select the name of an actor in a DVD-played movie and the processor then records or recommends other broadcast programs in which the actor appears.

In another aspect, a method for providing and recommending audio-video programs and/or content based on a viewer selection of a portion of content played on the TV includes receiving the content at the TV along with a viewer selection of a portion of the content. The method also includes automatically returning a viewing or shopping recommendation or automatically recording a broadcast program based on the selected portion.

In yet another aspect, a system for linking content to viewing and/or shopping recommendations includes means for receiving the content. The system also includes means for receiving a viewer selection some of the content. Also, means that are responsive to the viewer selection automatically access a source of recommended viewing and/or shopping.

In still another aspect, a system for recording broadcast content based on a viewer selection of a portion of content includes means for receiving the content, and means for receiving a viewer selection of portions of the content. Means are responsive to the viewer selection for automatically recording at least one broadcast program.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
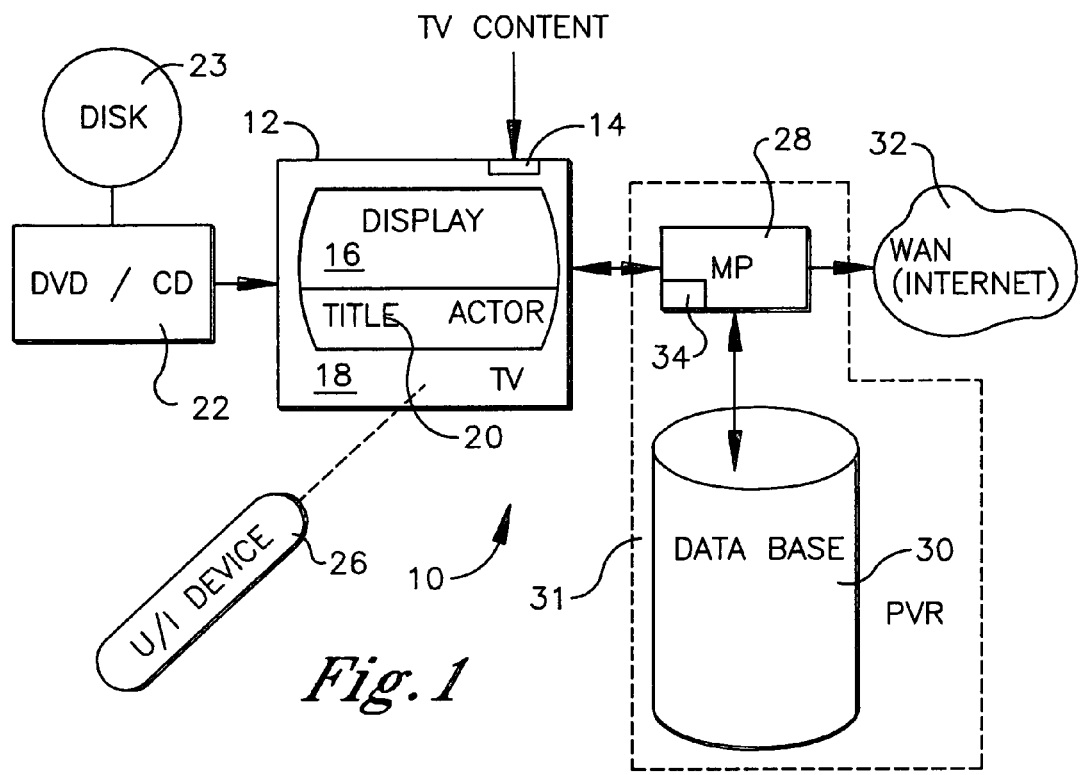
FIG. 1 is a block diagram of the system of the present invention.

Referring initially to FIG. 1, a system is shown, generally designated 10. As shown, the system 10 includes a TV 12 that conventionally receives televised content at a content receiver 14 (e.g., an antenna, satellite dish, set-top box, etc.) for display of the content on a monitor 16.

While the embodiment below discusses a TV 12 with a single housing that is shown separate from the microprocessor and database, it is to be understood that the term "television" encompasses any apparatus that has a television tuner and the below-described capability in a single housing or in separate housings that cooperate together. For instance, the term "TV" encompasses the television system shown in FIG. 1, as well as a conventional television in combination with a set-top box that functions in accordance with the present invention. In the latter example, the set-top box might include, e.g., the microprocessor discussed below. In a less preferred embodiment, the microprocessor discussed below can be a standalone computer such as a PC or laptop with its own monitor (not shown), and can communicate with the TV 12 by wired or wireless link or simply by transferring data from the TV to the computer using, e.g., a floppy diskette.

In the preferred non-limiting embodiment shown, the TV 12 includes a housing 18 that holds a conventional television tuner which receives the TV signals. The audio and video settings of the TV, i.e., the volume, tone, tint, color, contrast, and so on as conventionally provided in the art, are established by respective adjustable audio and video setting circuits. Also, the TV 12 can display media-stored content 20 on the monitor 16 received from a peripheral recording device associated with the TV, such as but not limited to a DVD player 22 that can play DVD disks 23 in accordance with principles known in the art. While for convenience a DVD player 22 is assumed, it is to be understood that the present invention also encompasses the use of players other than the DVD player 22, e.g., a CD player or a VCR.

While FIG. 1 shows that the DVD player 22 is separate from the TV housing 18, it is to be understood that the player 22 can be incorporated into the housing 18. Moreover, as mentioned above other types of players, such as compact disk (CD) players, flash memory readers, and so on can be used as the peripheral device, in which case the DVD disk 23 would be replaced by, respectively, a CD, flash memory medium, etc. In any case, the media-stored content provided from the peripheral device, that is, the player that is associated with the TV, is distinct from broadcast content received from an antenna, satellite dish, or cable. When used without a modifier, however, "content" refers to both media-stored content and to broadcast content.

The media-stored content 20 can be alpha-numeric content from the disk 23. Or, the media-stored content 20 can be non-alpha-numeric content such as video content. In any case, the content 20 is automatically or selectively displayed by a viewer by appropriately manipulating a remote control user input device 26 or other controls located on the housing 18. It is to be understood that while FIG. 1 shows that the U/I device 26 can be a conventional TV remote control device, other devices can be used, such as but not limited to keyboards, keypads, mice, touch screen technology, voice activation/recognition technology, etc.

A microprocessor 28 receives the content 20 and can store all or portions of it in a database 30. As intimated above, the preferred microprocessor 28 is integrated with the TV 12, either in the housing 18 or more preferably in a separate but associated housing such as a personal video recorder (PVR) 31 like Sony's TiVO® device in such a manner as to receive the content automatically.

If desired, the microprocessor 28 can also communicate with a wide area network (WAN) such as but not limited to the Internet 32 via cable or wire modem, DSL link, wireless link, or other network link in accordance with principles known in the art to access computer sites on, e.g., the World Wide Web. As intimated above, the microprocessor 28 (and/or the database 30) can be located in the housing 18 or it can be disposed elsewhere, such as in a set-top box, remote control U/I device 26, PVR, etc. In any case, the microprocessor 28 accesses a software-implemented link module 34 to execute the logic set forth herein. The database 30 can be contained in computer memory, or on a hard disk drive, optical drive, solid state storage, tape drive, removable flash memory, or any other suitable data storage medium.

It may now be appreciated that the microprocessor 28 undertakes the logic below. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 2:
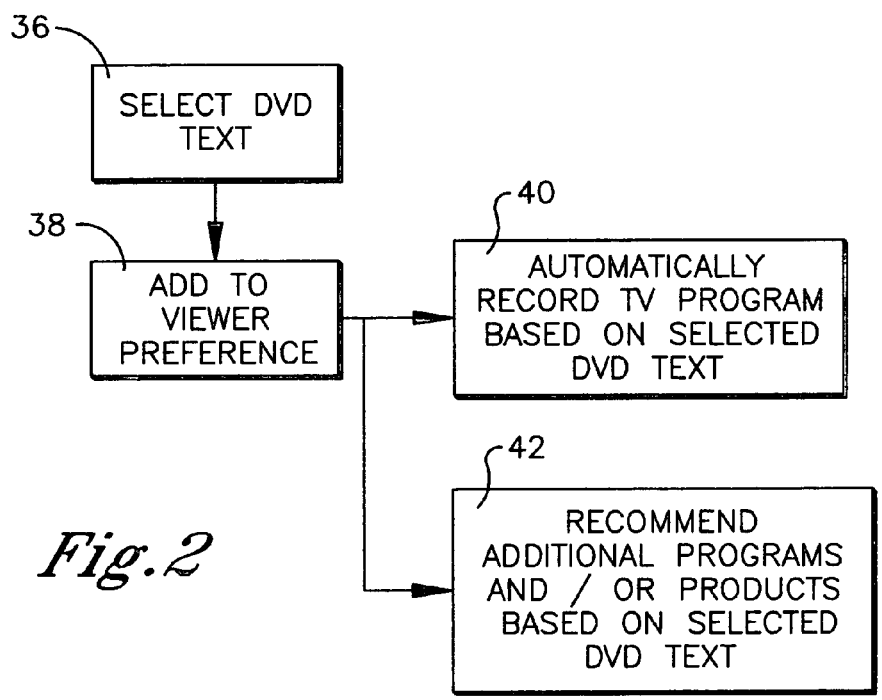
FIG. 2 is a flow chart of the present logic.

Now referring to the logic diagram shown in FIG. 2, at block 36 the viewer can select content, such as but not limited to alpha-numeric characters such as text, that is played as part of a program by the DVD player 22 and that is displayed on the monitor 16 of the TV 12. The selection can be made using the input device 26 by, e.g., highlighting the desired content and pressing an "enter" button on the input device 26. For example, the viewer might select the name of an actor in a movie or the title of a movie that is being played on the DVD player 22 and displayed on the TV 12. In other embodiments, the viewer might select a non-alpha-numeric portion of the played content, e.g., a scene of a farmhouse, and an image of the scene can be captured and classified using image recognition technology known in the art.

In any case, at block 38 the link module 34 adds the viewer selection to a viewer preference profile that can be stored in, e.g., the database 30 of the PVR 31. In the case of the above-mentioned TiVO® device, the media-stored content that is selected by the viewer is added to the existing viewing history in the database 30 so that future TV recording selections account not only for viewing history as is currently done in TiVO, but also to account for the viewer-selected content.

The link module 34 can then link the viewer preferences to other content. More particularly, if desired the link module 34 can move to block 40 to automatically record a TV program based on the selected portion of text at block 36. For instance, if the name of a particular actor is selected at block 36, the link module 34 can access a broadcast electronic program guide or can recognize the character's name in the opening credits of a broadcast program, and can automatically record broadcast programs in which the particular actor appears. Likewise, broadcast programs can be automatically recorded based on the appearance of other types of selected text or indeed based on the above-mentioned classifications of images selected by the viewer.

Additionally, at block 42 the link module 34 can recommend, based on the viewer's preferences, additional programs and/or products that the viewer might want to watch/purchase. The recommendations can be contained in the database 30, and can be periodically updated by the microprocessor 28 with information from the Internet 32. For example, if a viewer selects the name of an actor, additional movies starring the same actor can be recommended at block 42. The recommendations can be displayed on the monitor 16 of the TV 12 if desired. For systems that include associated media libraries such as DVD libraries, the recommendations can be of content stored in the library.

While the particular SYSTEM AND METHOD FOR LINKING DVD TEXT TO RECOMMENDED VIEWING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A system for linking content to viewing and/or shopping recommendations, comprising:
    an input device for selecting alpha numeric characters that are presented on a video display and that are within the video portion of a DVD content by highlighting the characters using the input device and pressing a selector key on the input device;
    means for receiving the alpha numeric characters;
    means responsive to the means for receiving for automatically accessing a source of recommended viewing and/or shopping.

2. The system of claim 1, further comprising means for storing at least some of the content.

3. The system of claim 1, wherein the input device is a user input device.

4. The system of claim 1, wherein the means for receiving includes a personal video recorder (PVR).

5. The system of claim 1, wherein the source of recommended viewing and/or shopping communicates with a WAN.

6. The system of claim 1, further comprising media player means for playing media-stored content on a storage medium and sending the media-stored content to a television.

7. A system for linking content to viewing and/or shopping recommendations, comprising:
    an input device for selecting alpha numeric characters that are presented on a video display and that are within the video portion of a DVD content, the alpha numeric characters representing an actor's name;
    a processor receiving the alpha numeric characters;
    the processor automatically accessing a source of recommended viewing and/or shopping to return content titles associated with the actor's name.

* * * * *